(12) United States Patent
Oba et al.

(10) Patent No.: US 9,429,451 B2
(45) Date of Patent: Aug. 30, 2016

(54) SENSOR WITH RESIN ENCAPSULATED TERMINAL SEPARATION

(71) Applicant: Mitsubishi Electric Corporation, Chiyoda-ku, Tokyo (JP)

(72) Inventors: Akihiro Oba, Chiyoda-ku (JP); Shigeki Tsujii, Chiyoda-ku (JP); Koki Yamamoto, Himeji (JP); Akira Koshimizu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 109 days.

(21) Appl. No.: 14/180,815

(22) Filed: Feb. 14, 2014

(65) Prior Publication Data

US 2015/0114146 A1 Apr. 30, 2015

(30) Foreign Application Priority Data

Oct. 24, 2013 (JP) .................. 2013-220835

(51) Int. Cl.
*G01D 11/24* (2006.01)
*H01R 13/40* (2006.01)

(52) U.S. Cl.
CPC ............... *G01D 11/24* (2013.01); *H01R 13/40* (2013.01)

(58) Field of Classification Search
CPC .... G01D 11/30; G01D 11/245; G01D 11/24; G21C 17/017; H01R 13/40
USPC ...................................... 73/866.5
See application file for complete search history.

(56) References Cited

U.S. PATENT DOCUMENTS 7,192,317 B2 * 3/2007 Nakagawa ........ B29C 45/14639
439/736
7,812,598 B2 * 10/2010 Yasuda ................... G01F 23/38
324/207.25

FOREIGN PATENT DOCUMENTS

| JP | 07-016874 A | 1/1995 |
| JP | 2003-251655 A | 9/2003 |
| JP | 2004-279030 A | 10/2004 |
| JP | 2010-161041 A | 7/2010 |
| JP | 2012-242195 A | 12/2012 |

OTHER PUBLICATIONS

Communication dated Oct. 21, 2014, issued by the Japanese Patent Office in counterpart Japanese application No. 2013-220835.

* cited by examiner

*Primary Examiner* — Lisa Caputo
*Assistant Examiner* — Nathaniel T Woodward
(74) *Attorney, Agent, or Firm* — Sughrue Mion, PLLC

(57) ABSTRACT

A sensor includes: a sensing module furnished with a sensing function; metal terminals transmitting a sensing signal from the sensing module; an insulating fixing portion holding multiple metal terminals separately; and a resin portion encapsulating the metal terminals and the sensing module and also forming a connector portion from which tip ends of the metal terminals are exposed. Protruding portions of the fixing portion are fit into hole portions of the metal terminals before resin encapsulation in a stage where the metal terminals are bonded to the sensing module, so that rigidity of the metal terminals is enhanced to stabilize the locations thereof.

4 Claims, 5 Drawing Sheets

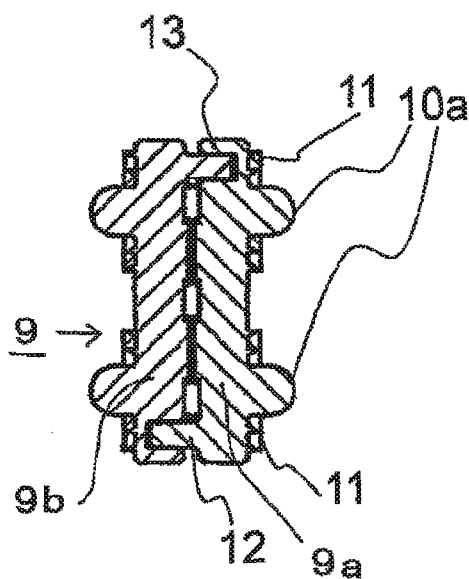
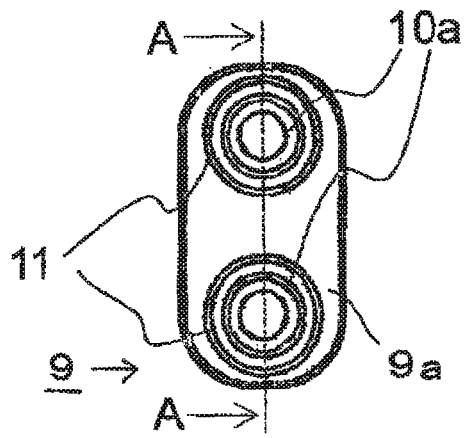
Fig. 4A          Fig. 4B
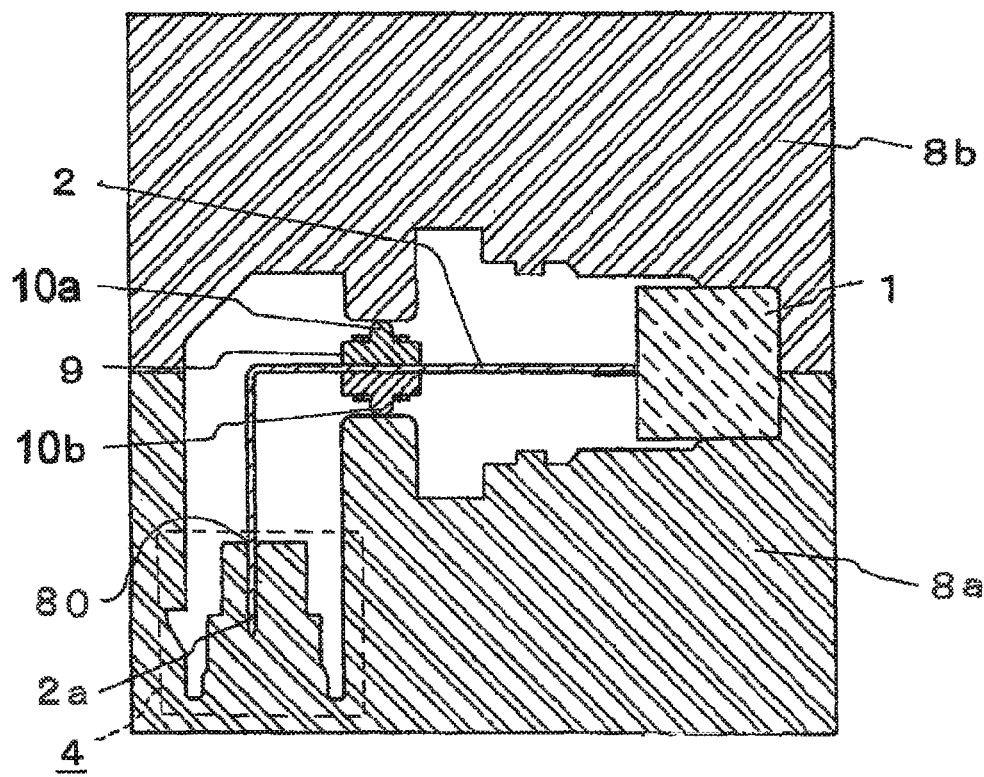
Fig. 5

SENSOR WITH RESIN ENCAPSULATED TERMINAL SEPARATION

BACKGROUND OF THE INVENTION

1. Field of the Invention

The present invention relates to a sensor shaped by insert molding.

2. Description of the Related Art

A basic configuration of an in-vehicle sensor in the related art is formed, for example, of a sensing module having functional parts necessary for sensing, metal terminals transmitting a sensing signal from the sensing module, and resin encapsulating these components and further forming an exterior, such as a connector. Connector pins (parts of the metal terminals exposed from the resin in the connector) are provided at tip ends of the metal terminals on one side. Example of this configuration is described, for example, in Patent Document 1.

[Patent Document 1] JP-A-2012-242195

Because the connector pins fit to female connector terminals and transmit a sensing signal, a desired degree of accuracy is required for dimensions of the pins. For example, in the case of the sensor above, the exterior of which, such as a connector, is formed by metal terminal molding, a distance (pin height) from the tip end of the pin to an end face of the resin covering the pin has influences on a fitting state of the connector. It is therefore crucial to obtain appropriate accuracy for the pin height. Herein, accuracy of the pin height is known to depend on positional accuracy when the metal terminal is inserted into an exterior form die.

During the metal terminal molding, it is necessary to insert the metal terminals into a die used for the metal terminal molding. In this instance, the lack of rigidity of the metal terminals makes it difficult to perform a handling work by gripping the metal terminals, which is a center part of the product.

The lack of rigidity of the metal terminals also makes it particularly difficult to insert multiple metal terminals at a time when the metal terminals are inserted into the die, and this difficulty limits the productivity. Further, there is a problem that it is difficult to obtain a high degree of accuracy for the connector pin height due to an insufficient insertion amount.

Furthermore, after the sensing module provided with the metal terminals is inserted into the die, the position of the metal terminals is not stabilized due to the lack of rigidity, and such instability eventually causes a problem that the metal terminals possibly undergo deformation during exterior molding.

The invention was devised to solve the problems discussed above and has an object to provide a structure by which positional accuracy of the metal terminals with respect to the die can be readily ensured.

SUMMARY OF THE INVENTION

The invention was devised to solve the problems discussed above and has an object to obtain a sensor with which it becomes possible to readily ensure positional accuracy of metal terminals with respect to a die.

A sensor according to an aspect of the invention includes: a sensing module furnished with a sensing function; metal terminals transmitting a sensing signal from the sensing module; an insulating fixing portion holding multiple metal terminals separately; and a resin portion encapsulating the metal terminals and the sensing module and also forming a connector portion from which tip ends of the metal terminals are exposed.

According to the sensor of the invention, because multiple metal terminals are separately held by the fixing portion, a problem that the metal terminals lack rigidity can be solved. It thus becomes possible to perform a handling work with ease by gripping the fixing portion in the fabrication sequence.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIGS. 4A and 4B are a cross section and a top view, respectively, of a fixing portion that holds the metal terminals according to the second embodiment of the invention;

FIG. 5 is a cross section showing a fabrication sequence of the sensor according to the second embodiment of the invention;

DETAILED DESCRIPTION OF THE PREFERRED EMBODIMENTS

First Embodiment

Figure 1A:
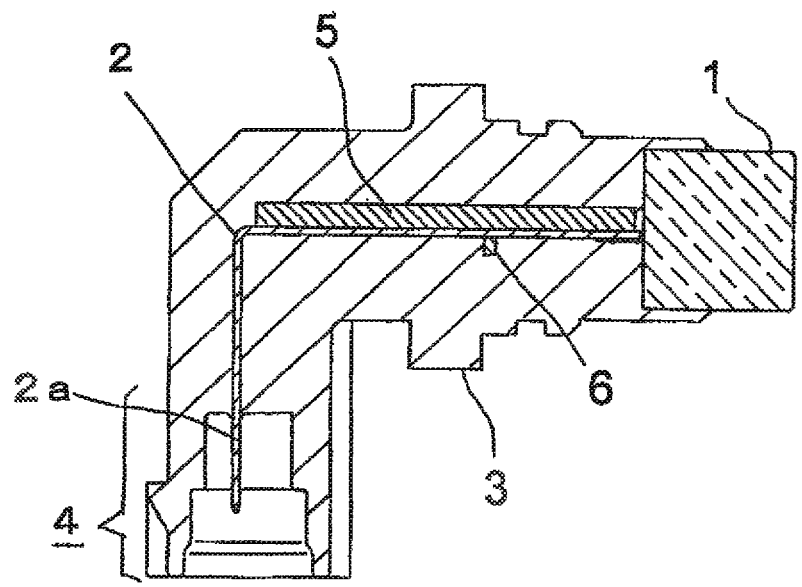
FIG. 1A is a cross section of a sensor and FIG. 1B is a bottom view of metal terminals according to a first embodiment of the invention.

Hereinafter, a sensor according to a first embodiment of the invention will be described according to FIGS. 1A and 1B and FIG. 2. FIG. 1A is a cross section of the sensor of the first embodiment and shows, for example, an in-vehicle sensor. As is shown in FIG. 1A, the sensor is provided with a sensing module 1 furnished with a sensing function, metal terminals 2 connected to the sensing module 1 and transmitting a sensing signal, an insulating fixing portion 5 holding multiple metal terminals 2 separately, and a resin portion (encapsulation resin) 3 encapsulating the metal terminals 2 and the sensing module 1 and also forming a connector portion 4 from which tip ends of the metal terminals 2 are exposed.

Herein, the sensing module 1 is formed, for example, of a field generation portion that generates a field, a magnetic detection element that detects a variance of the field, and electronic parts that make up a protection circuit against a foreign noise, all of which are combined into one unit.

In the first embodiment, the fixing portion 5 is embedded and encapsulated in the resin portion 3. Also, the fixing portion 5 is of substantially a flat-plate shape and has protruding portions 6 each protruding from a planar section to a back surface side. As is shown in a bottom view of FIG. 1B, each metal terminal 2 is of substantially a linear shape having predetermined width and thickness. Apart of the metal terminal 2 fitting to the protruding portion 6 is formed wider and a hole portion 7 is provided to this wider portion. The metal terminals 2 and the fixing portion 5 are fixed to each other by fitting the protruding portions 6 into the hole portions 7. As is shown in FIG. 1A, the metal terminal 2 is bent into the shape of a capital L. One end is connected to the sensing module 1. The other end serves as a pin 2a that forms the connector portion 4 and is exposed to the outside from the connector portion 4.

Herein, the fixing portion 5 is, for example, 1-mm thick and can be obtained by injection molding. The fixing portion 5 is disposed on one of the two linear portions forming an L shape of the metal terminal 2 on the closer side to the sensing module 1. The fixing portion 5 is formed to have a length substantially as long as this linear portion. The other linear portion of the metal terminal 2 is formed so as to extend in a direction same as the protruding direction of the protruding portions 6 provided to the fixing portion 5. Hence, by pressing the fixing portion 5 at a point in the vicinity of the bending portion of the metal terminals 2 toward the pin 2a, a pressing force can be applied homogeneously to all of the metal terminals 2 supported on the fixing portion 5.

Figure 1B:
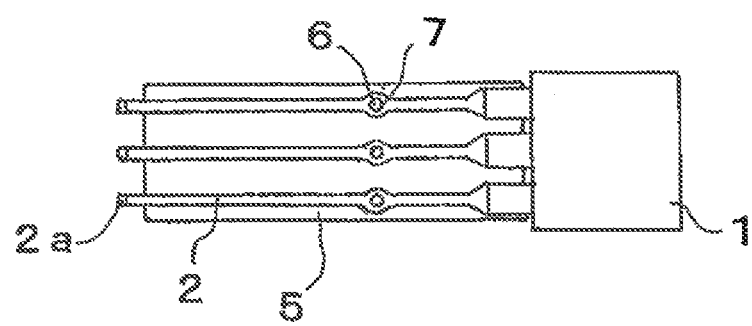

FIG. 1B shows a bottom view of the metal terminals 2 held by the fixing portion 5. As is shown in the drawing, the metal terminal 2 is a member of substantially a linear shape having a predetermined width. Multiple metal terminals 2 are disposed so as to be spaced apart from one another and extend in one direction. Further, FIG. 1B shows a case where three meal terminals 2 are disposed parallel to one another.

The above has described that the fixing portion 5 is made of an insulating substance. It should be appreciated, however, that, the fixing portion 5 may be made, for example, of resin same as that making up the resin portion 3 instead. Regarding a method of attaching the fixing portion 5 to multiple metal terminals 2, an easy method is, for example, to press-fit the protruding portions 6 integrally molded with the fixing portion 5 into the hole portions 7 provided to the metal terminals 2 followed by thermal caulking.

Figure 2:
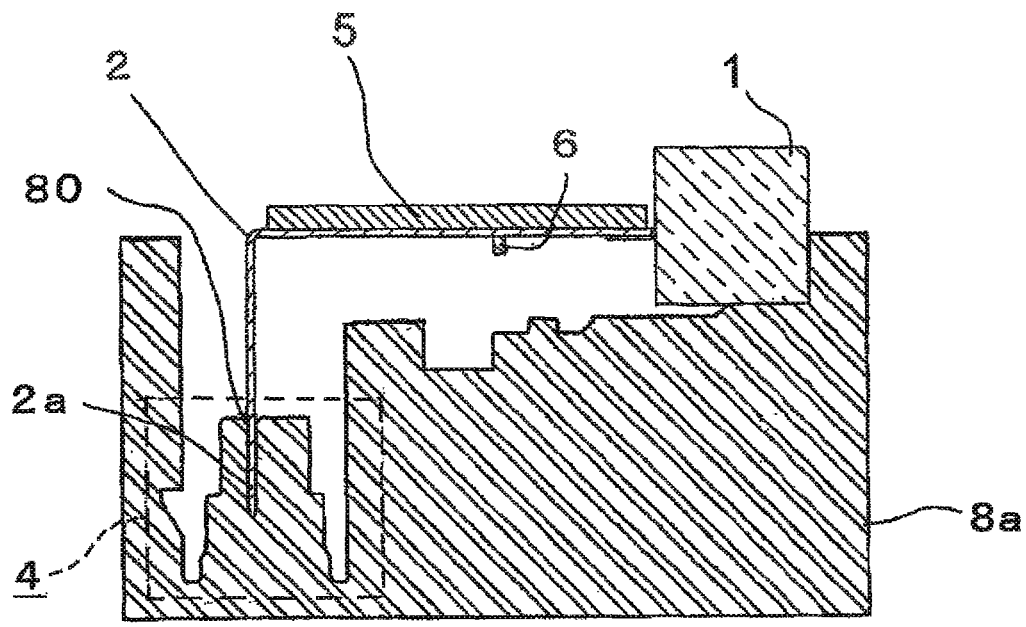
FIG. 2 is a cross section showing a fabrication sequence of the sensor according to the first embodiment of the invention.

In an exterior molding step of the fabrication sequence of this sensor, as is shown FIG. 2, the metal terminals 2 connected to the sensing module 1 are inserted into a recess portion (insertion portion) 80 in a lower die 8a used for metal terminal molding. Because the fixing portion 5 is attached to the metal terminals 2, a problem that the metal terminals 2 lack rigidity is solved. Hence, when the metal terminals 2 are inserted into the lower die 8a, it becomes possible to perform a handling work with ease by gripping side surface portions of the fixing portion 5. In contrast to the related art by which the pins 2a of the metal terminals 2 are inserted into the recess portion 80 in the lower die 8a one by one, it becomes possible to set multiple pins 2a into the lower die 8a at a time.

In addition to the configuration that multiple metal terminals 2 are fixed by the fixing portion 5, it becomes possible to perform a work to grip and press the fixing portion 5 against the lower die 8a. Hence, an insertion work into the lower die 8a becomes easier. It thus becomes possible to ensure positional accuracy of the pins 2a of the connector portion 4 with respect to the lower die 8a.

Accordingly, not only can the spaced locations of the respective metal terminals 2 be maintained, but also accuracy of an insertion height into the recess portion 80 in the lower die 8a can be increased more easily by suppressing irregular insertion heights of the pins 2a into the lower die 8a. It thus becomes possible to increase a degree of positional accuracy of the metal terminals 2.

Further, because the positional relation of the metal terminals 2 is stabilized by attaching the fixing portion 5, it becomes possible to suppress deformation of the metal terminals 2 during the exterior molding.

Second Embodiment

A sensor according to a second embodiment of the invention will now be described using FIG. 3 through FIG. 5. In the first embodiment above, the fixing portion 5 holding multiple metal terminals 2 separately is of substantially a flat-plate shape and fixed by fitting the protruding portions 6 protruding to the back surface side into the hole portions 7 of the metal terminals 2. The second embodiment is characterized in that, as is shown in a cross section of the sensor of FIG. 3, a fixing portion 9 is of a configuration so as to fix multiple metal terminals 2 by sandwiching the metal terminals 2 from two directions, for example, from above and below. Further, the second embodiment is characterized in that the metal terminals 2 can be positioned inside a form die by sandwiching the fixing portion 9 between an upper die and a lower die of an exterior form die.

Figure 3:
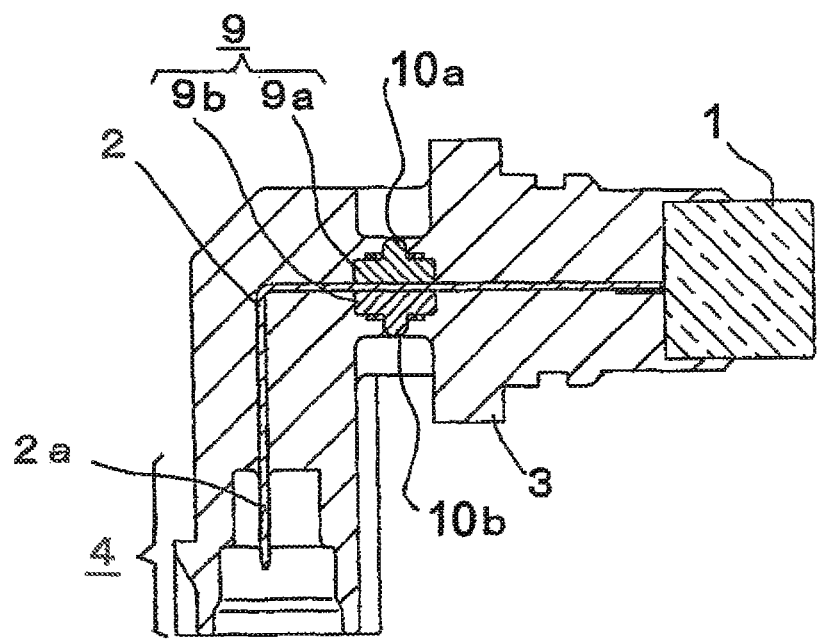
FIG. 3 is across section of a sensor according to a second embodiment of the invention.

As is shown in FIG. 3, the sensor of the second embodiment uses the fixing portion 9 formed of upper and lower fixing parts 9a and 9b in order to further increase a degree of terminal height accuracy in comparison with the sensor described in the first embodiment above. The fixing portion 9 is provided with a positioning portion 10a of a protruding shape that performs positioning in the resin encapsulation step by coming into contact with the exterior molding upper die 8b and a positioning portion 10b of a protruding shape that performs the positioning by coming into contact with the lower die 8a.

As are shown in a cross section of the fixing portion 9 of FIG. 4A and a top view of the fixing portion 9 of FIG. 4B, the fixing part 9a has the positioning portion 10a of a protruding portion coming into contact with the upper die 8b and the fixing part 9b has the positioning portion 10b of a protruding shape coming into contact with the lower die 8a. The positioning portions 10a and 10b are protrusions that protrude outward from substantially planar sections of the fixing parts 9a and 9b coming into contact with the upper surface and the lower surface of the metal terminal 2, respectively, that is, protrusions protruding upward and downward, respectively. Also, melt ribs 11 are provided on the periphery of the positioning portions 10a and 10b on the surfaces of the substantially flat-plate portions of the fixing parts 9a and 9b. Tapered tip ends of the melt ribs 11 are melted with heat from the resin during the exterior molding and thereby seal the interior from the exterior resin.

Also, each of the fixing parts 9a and 9b, which are two parts forming the fixing portion 9, has a protruding portion 12 and a hole portion 13 having a dimensional relation such that the former can press-fit into the latter in an inner surface portion of substantially the flat-plate surface. As is shown in the cross section of FIG. 4A, by press-fitting the protruding portions 12 of the fixing parts 9a and 9b into the hole portions 13 of the respective mating fixing parts 9b and 9a while sandwiching the metal terminals 2 in between, it becomes possible to attach the fixing portion 9 to the metal terminals 2 with ease. Also, as is shown in FIG. 4A, grooves in which to fit the metal terminals 2 are provided to bonding surfaces of the fixing parts 9a and 9b.

As is shown in a cross section of the sensor in the fabrication sequence of FIG. 5, in a stage before injection of encapsulation resin, more specifically, after a structure obtained by combining the sensing module 1 and the metal terminals 2 attached with the fixing portion 9 into one unit is set to the lower die 8a and the lower die 8a and the upper die 8b are put together, the metal terminals 2 can be positioned inside the die in a stable state by the fixing portion 9.

By positioning the metal terminals 2 inside the die using the fixing portion 9, it becomes possible to suppress up and down variances of the position of the metal terminals 2 in the resin injection step during the exterior molding. Hence, in the case of the connector portion 4, in which the height direction of the pins 2a of the connector portion 4 coincides with the up-down direction of the exterior form die, the height accuracy of the pins 2a of the connector portion 4 can be ensured.

Third Embodiment

A sensor according to a third embodiment of the invention will now be described using FIGS. 6A and 6B and FIG. 7.

The first and second embodiments have described cases where the fixing portion 5 or 9 is attached to one linear portion continuing to the sensing module 1 out of the linear portions of the metal terminal 2 bent in the shape of a capital L, however, the third embodiment will describe a case where a fixing portion 15 is attached to the other linear portion of the metal terminal 2 which is later formed into the connector portion 4.

Figures 6A, 6B:
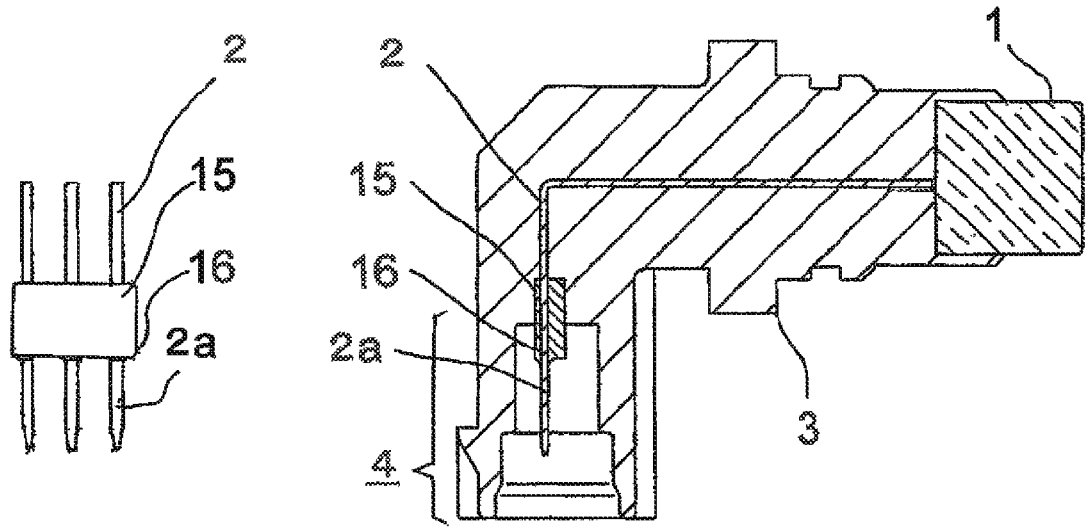
FIG. 6A is a side view of metal terminals and FIG. 6B is a cross section of a sensor according to a third embodiment of the invention.

As are shown in a side view of the metal terminal 2 of FIG. 6A and a cross section of the sensor of FIG. 6B, the fixing portion 15 can be of any shape as long as a positioning portion 16 for the lower die 8a is provided and also all of the multiple metal terminals 2 can be held separately while the pins 2a are exposed. The fixing portion 15 can be made of an insulating substance, such as a resin material.

FIGS. 6A and 6B show one part having a hole portion into which the metal terminals 2 can be inserted as the fixing portion 15 by way of example, and show a case where the pins 2a are inserted into the hole portion of the fixing portion 15 and the fixing portion 15 is held at a position that is later formed into the connector portion 4 of the metal terminal 2. It should be appreciated, however, that the fixing portion 15 is not limited to this configuration. As in the first embodiment above, it may be configured in such a manner that the hole portions 7 are preliminarily opened in the vicinity of the connector portion 4 of the metal terminals 2 and the protruding portions protruding from a member of a flat-plate shape forming the fixing portion 15 are fit into these hole portions 7 of the metal terminals 2. Also, as in the second embodiment above, it may be configured in such a manner that the fixing portion 15 holds multiple metal terminals 2 by sandwiching the metal terminals 2 between two parts of substantially a flat plate shape.

Figure 7:
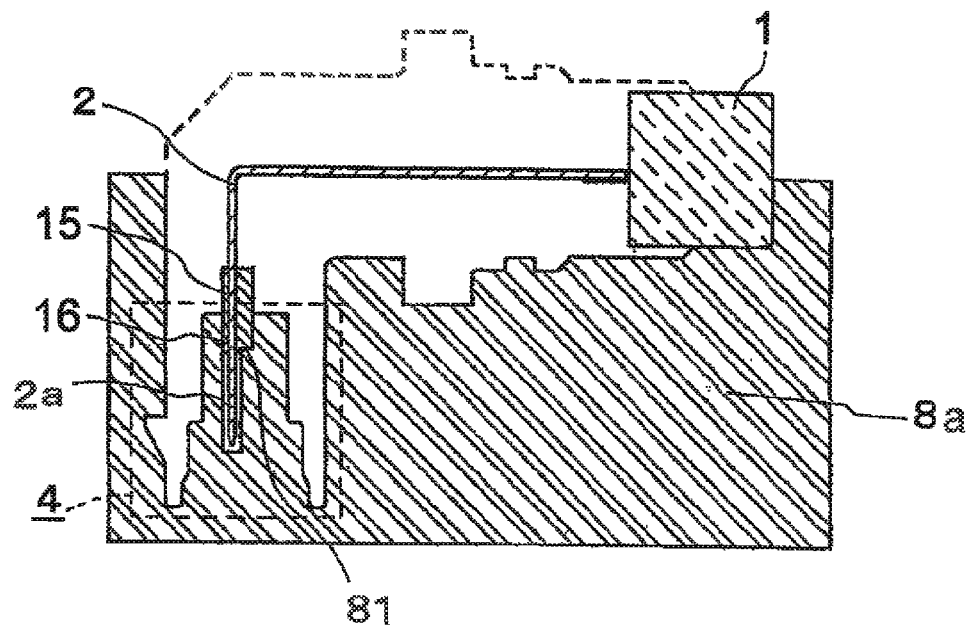
FIG. 7 is a cross section showing a fabrication sequence of a sensor according to the third embodiment of the invention.

As is shown in a cross section of the sensor of the third embodiment in the fabrication sequence of FIG. 7, in the third embodiment, all of the metal terminals 2 can be readily fixed into the lower die 8a by merely inserting the positioning portion 16. Hence, workability is enhanced in comparison with the first embodiment above and the like in which it is necessary to insert the pins 2a of the metal terminals 2 into the exterior form die one by one. The positioning portion 16 of the fixing portion 15 fits to a positioning portion of a recess portion 81 provided to the lower die 8a on a molding surface side and the lower surface of the positioning portion 16 abuts on a positioning portion, which is a step portion provided to the recess portion 81 for the positioning. The recess portion 81 also includes a hole portion formed deeper than the step portion of the positioning portion 16 for the pins 2a to be inserted therein. This hole portion, however, may not be used for the positioning.

Also, regarding the processing on the exterior form die, the recess portion 80 in the lower die 8a in which to insert the pins 2a of the metal terminals 2 is used for the positioning in the first embodiment and the like, and accuracy is therefore required for the opening dimension. On the contrary, for the sensor of the third embodiment, it is only necessary to provide the recess portion 81 into which to fit the fixing portion 15 as the positioning portion. In comparison with a case where the recess portion 80 into which to fit the pins 2a is provided to the lower die 8a for the positioning as in the first and second embodiments above, a high degree of accuracy is not necessary to form the recess portion 81 in which to fit the fixing portion 15 of the third embodiment. It thus becomes possible to facilitate the processing of the die.

It goes without saying, however, that the fixing portion 15 shown in FIGS. 6A and 6B may be additionally provided to the sensor provided with the fixing portion 5 or 9 described in the first or second embodiment, respectively, in order to further increase a degree of terminal height accuracy.

Fourth Embodiment

Figure 8:
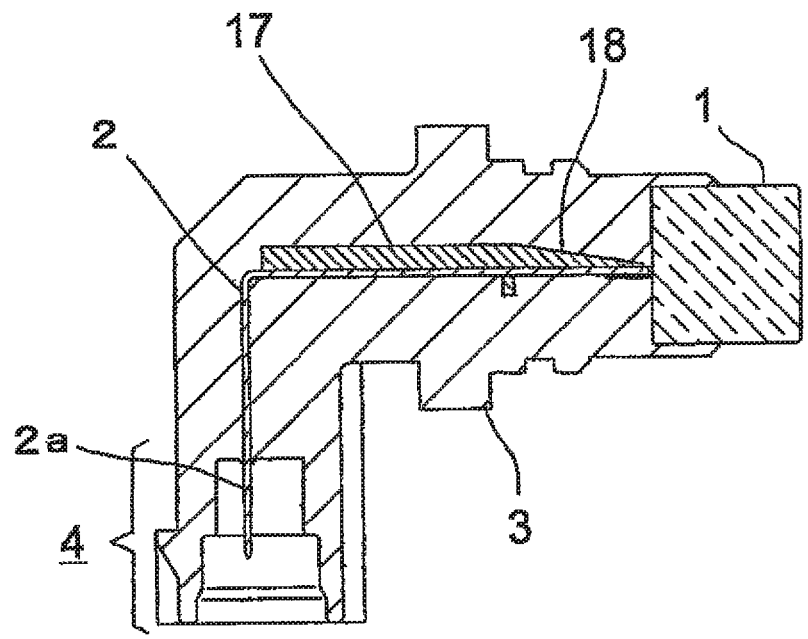
FIG. 8 is across section of a sensor according to a fourth embodiment of the invention.

A sensor according to a fourth embodiment of the invention will now be described using FIG. 8 and FIG. 9. As is shown in a cross section of the sensor of FIG. 8, a fixing portion 17 of the fourth embodiment is provided with a taper 18 that changes a direction of a force applied by a resin flow during the exterior molding in order to further increase a degree of terminal height accuracy in comparison with the sensor described in the first embodiment above. A shape of the taper 18 on the surface of the fixing portion 17 is of a shape such that the pins 2a are pressed in the direction of the lower die 8a when undergoing a force of the resin flow.

Figure 9:
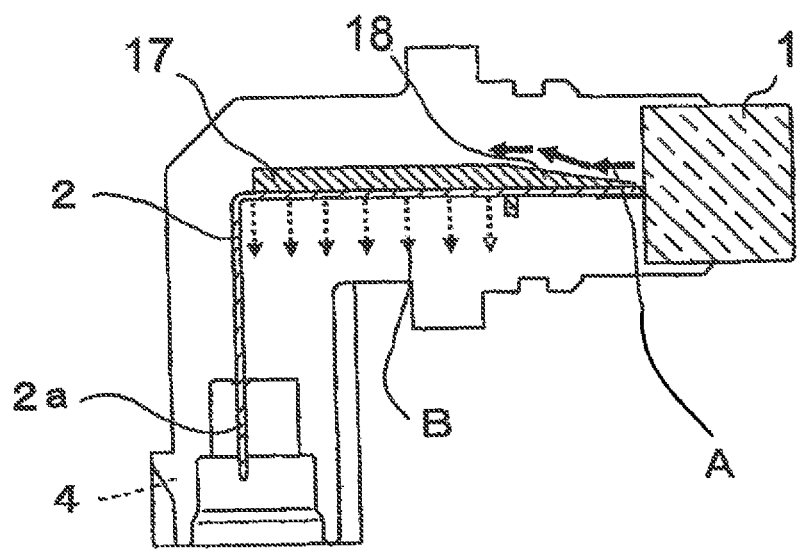
FIG. 9 is a cross section used to describe a fabrication sequence of the sensor according to the fourth embodiment of the invention.

FIG. 9 is a cross section of the sensor during the injection of encapsulation resin in the fabrication sequence. Given that a direction A indicated by arrows of FIG. 9 (a direction from the sensing module 1 to the bending portion of the metal terminals 2) is a direction of the resin flow. Then, due to the taper 18, the fixing portion 17 undergoes a force in a direction B, that is, a direction of the lower die 8a used during the exterior molding. Further, the metal terminals 2 undergo a force in the same direction via the fixing portion 17. Hence, insufficient insertion of the tip ends of the metal terminals 2 into the lower die 8a is lessened and the pins 2a can be set to an appropriate height. Consequently, it becomes possible to increase a degree of height accuracy of the pins 2a of the connector portion 4 in the completed sensor.

Also, the second embodiment above has described a case where the fixing portion 9 has the positioning portions 10a and 10b of a protruding shape coming into contact with the upper die 8b and the lower die 8a, respectively. It goes without saying, however, that a degree of height accuracy of the pins 2a can be increased by additionally providing the fixing portion 9 with a portion corresponding to the taper 18 that changes a direction of the resin flow shown in FIG. 8.

It should be understood that the respective embodiments above can be combined without any limitation and the respective embodiments can be modified or omitted as the need arises within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A sensor with resin encapsulated terminal separation, the sensor comprising:
    a sensing module furnished with a sensing function;
    metal terminals shaped of a capital L which transmit a sensing signal from the sensing module, each of the metal terminals comprising a first linear portion connected to the sensing module and a second linear portion which is bent from the first linear portion, each of respective second linear portions comprising a tip;
    a fixing portion which is spaced apart from the tips of respective metal terminals and to which the first linear portions of the respective metal terminals are separately attached proximate the sensing module; and
    a resin portion, which encapsulates the fixing portion, the metal terminals, and the sensing module, and forms a connector portion, from which ends of the tips of the respective metal terminals are exposed,
    wherein the tips of the second linear portions of the metal terminals protrude in a first direction, the first linear portions have an upper side proximate the fixing portion and a lower side opposing the upper side as seen in the first direction, and
    the fixing portion comprises:
    a planar portion which is disposed on the upper side of the first linear portions which are located in a vicinity of the sensing module, wherein the planar portion is extended away from the sensing module along a length direction of the first linear portions, and formed to have a length substantially as long as the first linear portions; and
    protrusions which are disposed on the planar portion and protrude in a same first direction as the tips, to fix the respective metal terminals to the fixing portion,
    wherein each of the first linear portions of the metal terminals comprises an opening, and each respective protrusion is penetrated through a corresponding opening to fix the first linear portion of the respective metal terminal to the fixing portion.

2. The sensor with resin encapsulated terminal separation according to claim 1, wherein:
    a portion of a surface of the fixing portion, which is located in the vicinity of the sensing module, has a shape of a taper.

3. The sensor with resin encapsulated terminal separation according to claim 1, wherein:
    the sensing module is provided with a field generation portion that generates a field and a magnetic detection element that detects a variance of the field.

4. The sensor with resin encapsulated terminal separation according to claim 1, wherein:
    the sensor is employed as an in-vehicle device.

* * * * *